United States Patent
Regnard et al.

(10) Patent No.: US 12,233,518 B2
(45) Date of Patent: Feb. 25, 2025

(54) METHOD FOR THE SERVO-INSTALLATION OF A THREADED FASTENER

(71) Applicant: LISI AEROSPACE, Paris (FR)

(72) Inventors: Benoit Regnard, Les Clayes sous Bois (FR); Clément Rousseau, Paris (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 18/653,201

(22) Filed: May 2, 2024

(65) Prior Publication Data

US 2024/0391069 A1    Nov. 28, 2024

(30) Foreign Application Priority Data

May 26, 2023    (FR) ...................................... 2305258

(51) Int. Cl.
B25B 23/147    (2006.01)

(52) U.S. Cl.
CPC .................. B25B 23/147 (2013.01)

(58) Field of Classification Search
CPC ..... B25B 23/147; B25B 21/002; B25B 23/14; F16B 2031/022; F16B 31/02; B25F 5/00; Y10T 29/49947; Y10T 29/53
See application file for complete search history.

(56) References Cited

U.S. PATENT DOCUMENTS

| | | | |
|---|---|---|---|
| 6,009,759 A | 1/2000 | Kibblewhite et al. | |
| 7,650,792 B2 | 1/2010 | Kibblewhite | |
| 2013/0047408 A1* | 2/2013 | Kibblewhite | B25F 5/00 29/700 |

FOREIGN PATENT DOCUMENTS

| | | |
|---|---|---|
| EP | 1570956 | 8/2009 |
| JP | 5595105 | 9/2014 |

OTHER PUBLICATIONS

Pothmann, Johannes, Preliminary Search Report, Nov. 8, 2023, 2 pages, National Institute of Industrial Property, Courbevoie, France.

* cited by examiner

*Primary Examiner* — Jason L Vaughan
*Assistant Examiner* — Amanda Kreiling
(74) *Attorney, Agent, or Firm* — Henricks Slavin LLP (57) ABSTRACT

A method for the installation of a threaded fastener (10) in a structure, the threaded fastener comprising a screw (20) and a nut (28), the method comprising the following steps:

a) inserting the screw into the structure, and tightening the nut onto the screw, b) simultaneously transmitting/receiving ultrasonic waves into/from the fastener for the measurement of a parameter representative of a variation in said waves, said first parameter providing an indirect measurement of an axial tension in the screw, c) stopping the screwing when a target value for the first parameter is reached.

The process further comprises determining the thickness of the structure to be tightened, and determining the target value of the first parameter in accordance with the thickness of the structure to be tightened and the geometrical characteristics of the fastener (10).

12 Claims, 6 Drawing Sheets

METHOD FOR THE SERVO-INSTALLATION OF A THREADED FASTENER

SUMMARY

The present invention relates to a method for the installation of a threaded fastener in the bore of a structure, the threaded fastener comprising a screw and a nut, the method comprising the following steps: a) inserting the screw into the bore, and screwing the nut onto the screw; b) simultaneously transmitting ultrasonic waves into the fastener and receiving reflected ultrasonic waves for the measurement of a first parameter representative of a variation in said waves, said first parameter providing an indirect measure of the axial tension in the screw; c) stopping the screwing when a target value for the first parameter is reached.

Such a method, described in particular in EP1570956, makes it possible to control the installation of a threaded fastener to a target tension, for example by measuring the variation in the time-of-flight of ultrasonic waves transmitted and received in the screw, the time-of-flight providing an indirect measure of the axial tension in the screw, the latter being lengthened under the effect of the tension.

When the structure between the screw head and the nut is tightened, the screw is subjected to elongation. Two screws of the same length can be used to join structures of different thicknesses, and the actual tension applied to the screw depends on the tightened thickness. However, a target tension for a given screw does not take into account the actual tightened thickness.

In addition, tightening the nut on the screw heats up the screw, the temperature increase amplifies the screw's elongation and therefore reduces its axial tension. The time-of-flight of an ultrasonic wave injected into the screw during tightening is therefore modified, altering the estimate of the actual tension applied to the screw.

The purpose of the present invention is to provide a method for the servo-installation of a threaded fastener which corrects variations to the applied tension that result from the actual tightened thickness, and overheating.

To this end, the invention has as its object a method of the aforementioned type further comprising the following steps: d) determining the thickness of the structure to be tightened; and e) determining the target value of the first parameter in accordance with the thickness of the structure to be tightened and the geometrical characteristics of the fastener.

Among other advantageous aspects of the invention, the process comprises one or more of the following characteristics, taken individually or in accordance with all technically possible combinations:

- the first parameter is selected from: the time-of-flight of a longitudinal ultrasonic wave; a resonance frequency shift of the screw; and a ratio of the time-of-flight of a longitudinal or transverse ultrasonic wave to the thickness of the structure to be tightened;
- the geometrical characteristics of the fastener are selected from: a screw length, a length of the threaded portion of the screw, a screw thread pitch, a nut length, a nut counterbore length, a threading length of the nut and a distance between the end surface of the nut and at least one locking point;
- determining the target value of the first parameter comprises comparing the structural thickness with a set of thickness values, said set of thickness values being associated with a set of target values of the first parameter for a given screw, corresponding to a set of target tensions for a given screw;
- determining the thickness of the structure comprises a step for detecting the start of tightening of the structure, corresponding to the application of axial tension in the screw;
- the screwing step is performed with an installation device provided with an electric motor, the method further comprising: measuring a second parameter representative of an energy variation of the electric motor relating to points of time; and detecting the start of tightening, said start of tightening corresponding to a predetermined variation of the second parameter;
- the second parameter is selected from the current intensity of an electric motor or the torque of a drive shaft;
- the determination of the structure thickness comprises a step of detecting the initial position of the nut on the screw;
- the step of detecting the initial position of the nut comprises the following steps: bringing an annular metal element into contact with an annular surface of the nut, the inner diameter of the annular metal element being smaller than the inner diameter of the annular surface of the nut; detecting contact between the annular metal element and the annular surface of the nut; rotating the nut on the threaded portion of the screw, and applying pressure to the annular metal element so as to maintain contact with the annular surface of the nut; detecting a loss of contact between the annular metal element and the annular surface of the nut as soon as one end of the threaded portion passes through the inner diameter of the annular surface of the nut, the detection of the loss of contact corresponding to the initial position of the nut;
- the method further comprises monitoring the temperature in the screw and adjusting the target value of the first parameter according to the temperature;
- at least one of said screw and said nut comprises a marking containing at least one identifier or geometrical characteristic of said screw or nut, the installation method further comprising a step of reading the marking and identifying at least the identifier or geometrical characteristic of the screw and/or nut, said reading step being performed prior to step e).

BRIEF DESCRIPTION OF THE DRAWINGS

The invention will be better understood upon reading the following description, which is presented only as a non-limiting example, and with reference to the drawings, in which.

DESCRIPTION

To facilitate understanding of the drawings, only the elements necessary for understanding the invention are shown. The same elements use the same references from one drawing to another.

Figure 1:
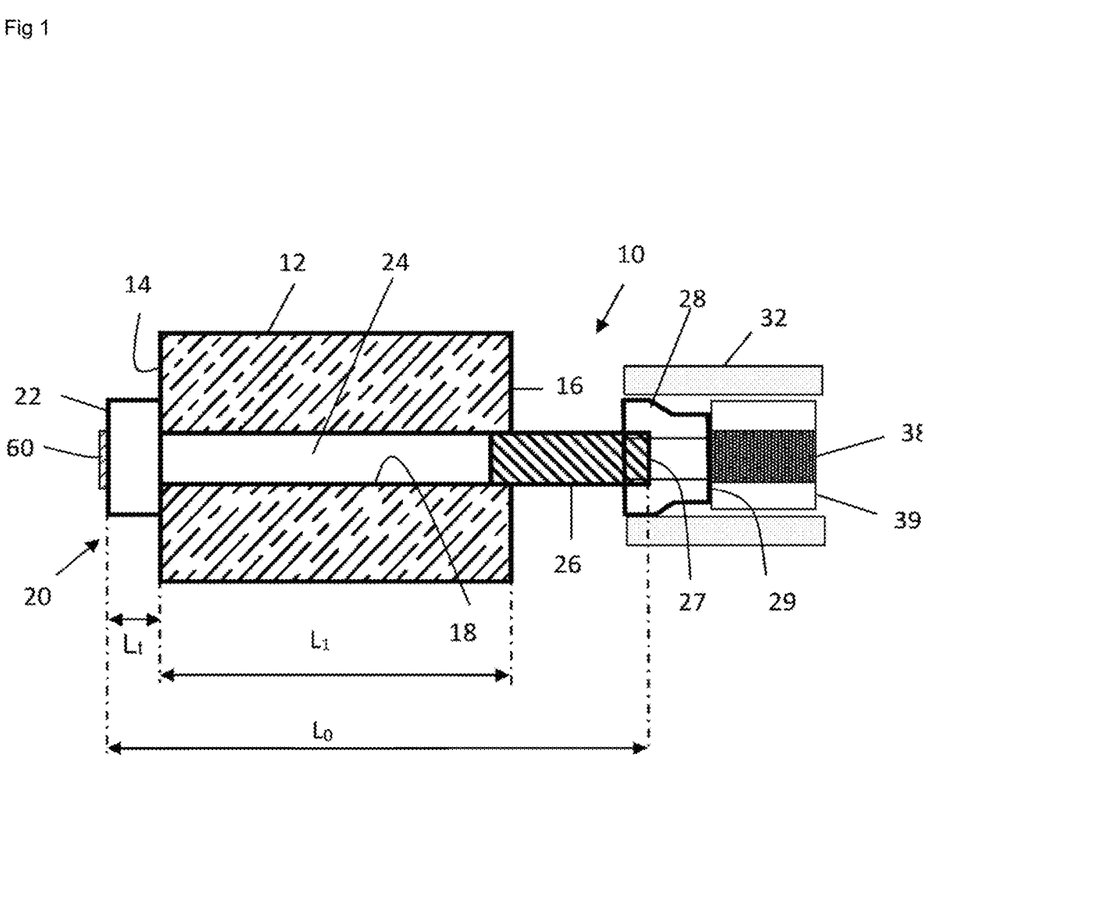
FIG. 1 is a longitudinal sectional view of a fastener and part of an installation device, the fastener being suitable for installation by an installation method according to one embodiment of the invention, with the fastener in an initial configuration.

FIG. 1 shows a threaded fastener 10 used to assemble a structure 12 shown schematically as a block, which may comprise several separate elements to be assembled. In this example, the structure comprises a front face 14, a rear face 16 and a through-hole 18. The fastener comprises a screw 20 with a head 22, a length $L_f$, and a body 24 with at least one threaded portion 26. The fastener also includes a nut 28, with a length $L_e$, partially screwed onto the threaded portion 26. As is well known, either the screw head 22 or the nut 28 have drive surfaces for rotating the screw or nut respectively.

The screw and nut can optionally include an unidirectional or bidirectional identification marking 60 applied to a portion of the screw, such as the end surface of the screw head 22, or the screw end 27, or to a surface of the nut. In the figures, marking 60 is shown on the screw head 22, as an example, without this example being limiting.

In the position of fastener 10 shown in FIG. 1, fastener 10 is considered in an initial state: no tension is applied to the screw, with the nut at a distance from the rear face 16 of structure 12. The length of the screw in its initial state, measured from the end of the head 22 to the screw end 27, is indicated by the reference $L_0$. Structural thickness is indicated by reference $L_1$.

Figure 3:
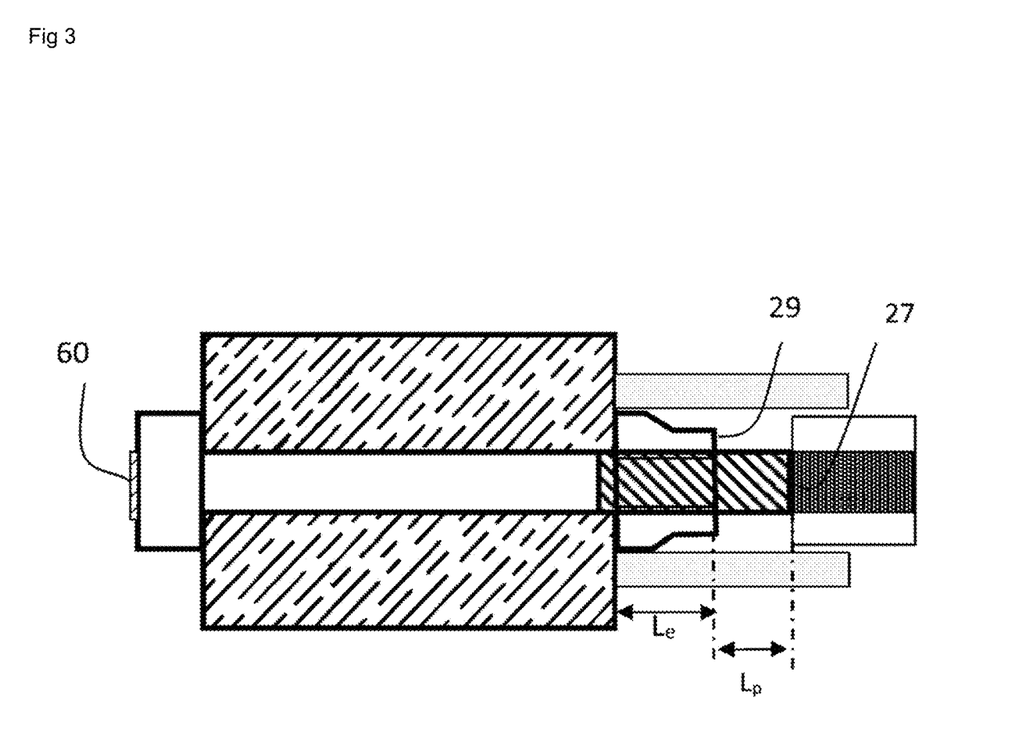
FIG. 3 is a longitudinal section view of the fastener shown in FIG. 1 and part of the installation device, in an installed configuration.

FIG. 3 shows the threaded fastener 10 in an installed configuration, tightening the structure 12. The underside of the screw head contacts the front face 14 of the structure 12, while the nut 28 contacts the rear face 16 of the structure 12. In the tightened position, an axial tension F is applied to the screw, while a compressive force is applied to the structure 12.

Figure 4:
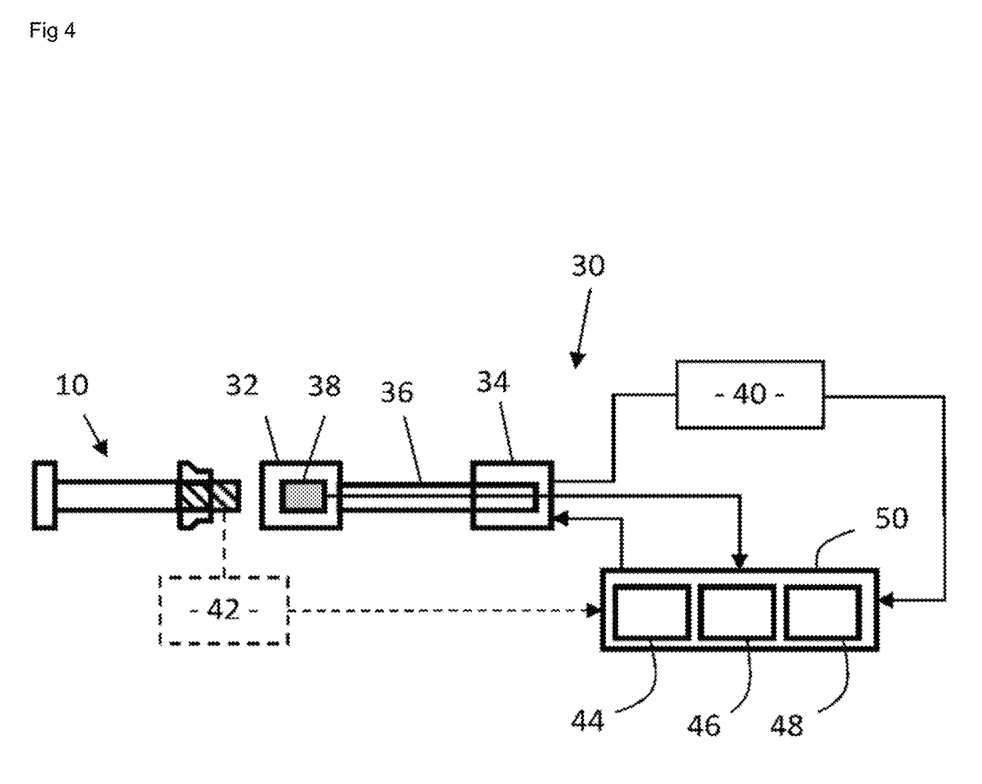
FIG. 4 is a diagram of an installation device suitable for use in an installation process according to one embodiment of the invention.

FIG. 4 shows an installation device 30, suitable for installing the fastener 10 in the structure 12.

The installation device 30 comprises a rotating socket 32, suitable for making contact with the drive surfaces on the screw head 22 or nut 28, and an electric motor 34 equipped with a shaft 36, suitable for driving the socket 32 in rotation.

The installation device 30 can be fitted with an ultrasonic generating device 38 such as a transducer comprising a piezoelectric component configured to convert electrical signals into ultrasonic waves and vice versa, or an EMAT ("ElectroMagnetic Acoustic Transducer").

Figure 2:
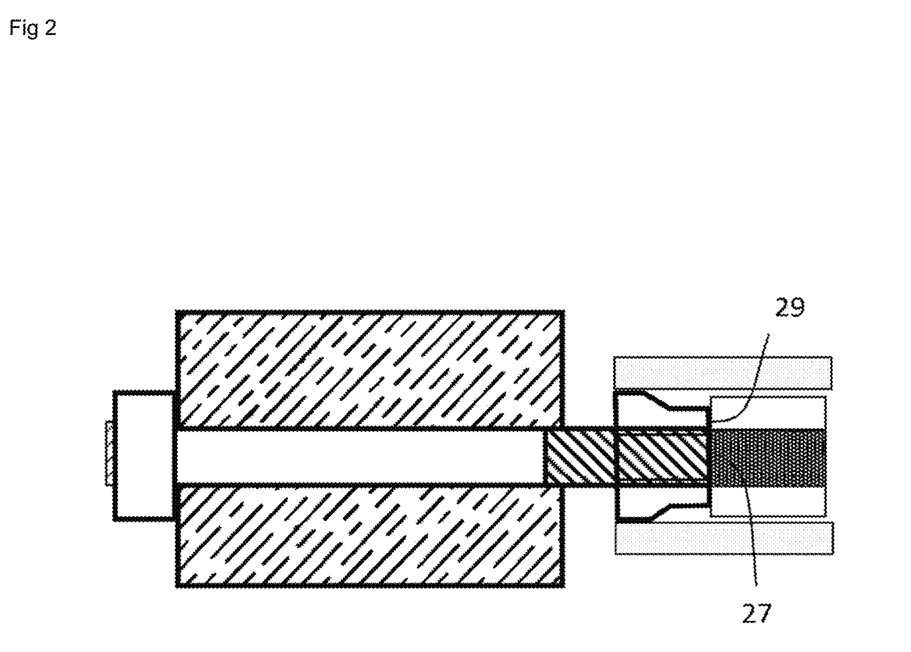
FIG. 2 is a longitudinal sectional view of the fastener and part of the installation device in an intermediate configuration.

In one embodiment, shown in FIGS. 1 to 3, the installation device 30 comprises an annular metal element 39 such as a ring, inside which the ultrasonic transducer 38 is positioned. The ring 39 and the ultrasonic transducer 38 are linked to form an assembly, and are capable of being translated together inside the socket 32, but without rotating with the socket 32.

In this example, the ring 39 has an inner diameter and an outer diameter. The rear surface of the nut forms an annular surface with the inner diameter that corresponds to the threading diameter. The inner diameter of the ring is designed to be smaller than the threading diameter of the nut 28, so that the ring and the ultrasonic transducer 38 cannot translate within the threading of the nut. A retaining device, such as a compression spring (not shown), holds the ring 39 and nut 28 in contact with the rear annular surface 29 of the nut.

The outer diameter of the ring is smaller than the inner diameter of socket 32. The outer diameter of the ultrasonic transducer 38 is selected to correspond with the outer diameter of the threaded portion 26 of the screw. A contact detection device (not shown) detects contact between the ring 39 and the rear surface 29 of the nut. This device could be an open circuit, a closed circuit, an electromagnetic device or a switch.

However, the ultrasonic transducer 38 does not necessarily have to be located in the installation device 30. For example, the ultrasonic generating device can be affixed to the end 27 of the screw.

The motor 34 is preferably fitted with an ammeter 40 to measure the current intensity used by the motor to tighten the nut. Alternatively, the motor is fitted with a torque sensor 40 capable of measuring the torque of the motor shaft. A temperature sensor 42 can be used to monitor the screw temperature in addition to the tool, as will be described subsequently.

Signals from the ultrasonic transducer 38, the sensor 40 and possibly the temperature sensor 42 are sent to the control unit 50, capable of controlling the activation or stoppage of the motor, in particular when the target value of the first parameter representative of the target axial tension in the screw is reached.

The control unit 50 is preferably integrated into the installation device 30, but it can also be deported to a laptop computer or a PLC connected to the installation device, especially for providing greater computing power and the display of signals and measured or calculated values in real time.

Alternatively, the installation device 30 is equipped with a display capable of displaying one or more values selected by an operator from a pre-selection of possible values, such as the measured voltage, the measured motor current intensity or torque, the calculated voltage, or the temperature.

The control unit 50 comprises a processor 44, which receives, amplifies and filters the signals emitted by the sensors, a calculator 46 and a memory 48.

Processor 44 may include a converter for converting analog signals from the sensors into digital signals.

The calculator 46 is configured to calculate an electric motor energy variation and a thickness $L_1$ of the structure 12 to be tightened, based in particular on certain values from processor 44 as well as the geometrical characteristics of the screw and the nut. The calculator can thus include one or more algorithms for processing digital signals from the processor 44, and extracting specific values from them. The calculator can also be configured to correct target values in particular as a function of the temperature in the screw, if a temperature sensor 42 is used during the installation of the fastener 10.

The calculator 46 is also configured to compare measured or calculated values with predefined values or ranges of values of torque, current intensity, temperature, voltages and geometrical characteristics of the screw 20 or the nut 28, stored in the memory 48. The result of the comparison is used by the calculator to determine a target value for the first required parameter, and controls the motor 34 accordingly.

The calculator 46 is also configured to calculate the distance travelled by the nut 28 on the threaded portion 26 of the screw from an initial position to the start position for tightening, in particular in accordance with the geometrical characteristics of the screw and the nut.

Figure 5:
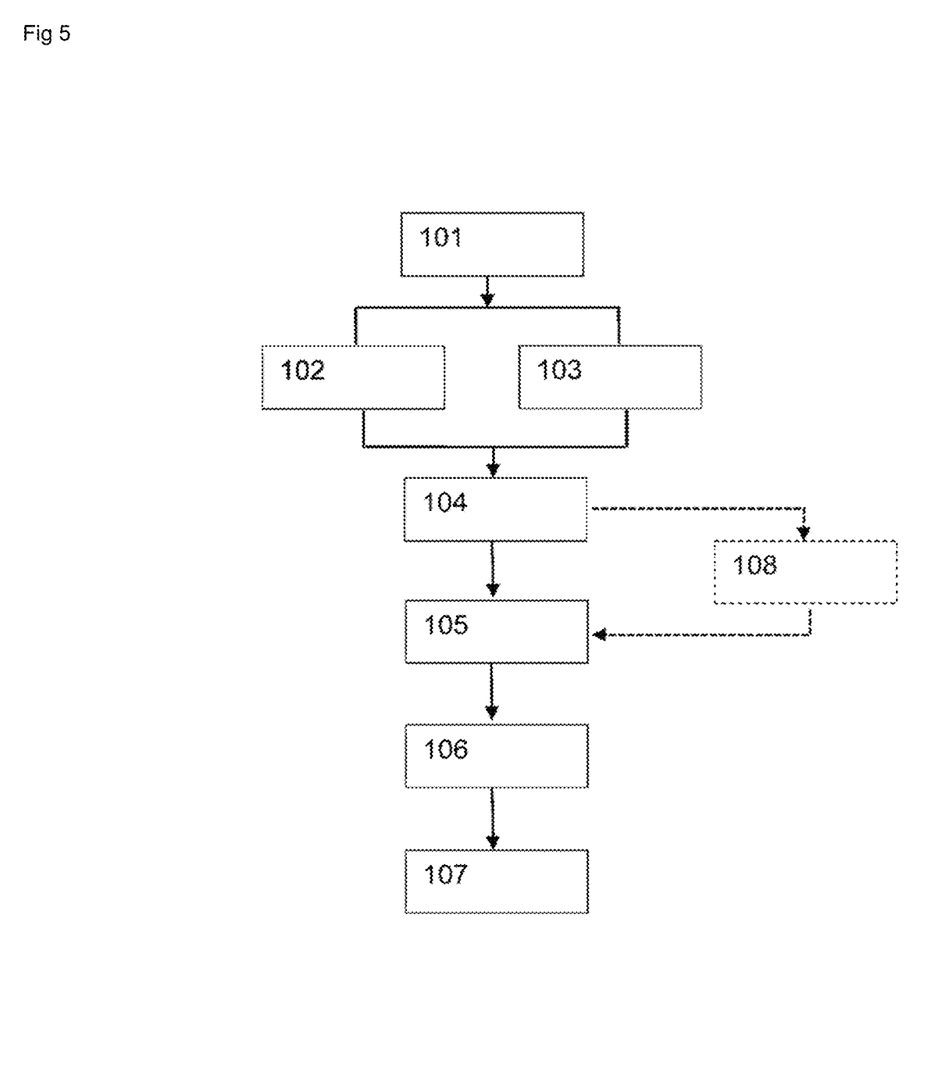
FIG. 5 is a block diagram illustrating the steps in an installation process according to one embodiment of the invention.

A method 100 for installing the fastener 10 in the structure 12 by means of the installation device 30 will now be described. The process is illustrated in FIG. 5.

Prior to implementing the process 100, the fastener is placed in the initial configuration shown in FIG. 1. The screw 20 is then inserted into the hole 18 in the structure 12 until one end 27 of the threaded portion 26 emerges from the rear face 16. The nut 28 is placed on said end, engaging at least one thread, for example by screwing it in by hand until any locking points are engaged. In this example, the installation device 30 comprises an ultrasonic transducer 38 housed in the ring 39 inside the socket 32. The socket is adapted to drive the nut 28 in rotation. Details of this part of the installation device 30 are shown schematically in FIGS. 1 to 3.

The screw 20 is held in a rotational position by inserting a key of non-circular cross-section into a recess of the same cross-section in the end 27 of the fastener (not shown).

The installation process begins with the screwing step 101, during which the installation device 30 is positioned close to the fastener 10 so that the socket 32 engages the drive surfaces of the nut 28. The ring 39 and the ultrasonic transducer 38 are in contact with the rear surface 29 of the nut 28, but not with the end 27 of the screw. Contact between the ring 39 and the nut 28 is detected by the contact detection device. The motor of the installation device 30 is then activated to rotate the nut. The nut then moves over the threaded portion 26 of the screw. The assembly formed by the ring 39 and the ultrasonic transducer 38 are pressed in the longitudinal direction towards the screw head by the retaining device throughout the installation process.

When the annular surface 29 of the nut is coplanar with the end 27 of the screw, as shown in FIG. 2, the ring 39 and the ultrasonic transducer 38 come into contact with the end 27 of the screw.

The motor continues to drive the socket 32 in rotation, and therefore continues to drive the nut 28 on the threaded portion 26 of the screw. The ring 39 and the ultrasonic transducer 38 remain in contact with the end 27 of the screw, held in place by the retaining device, since the inner diameter of the ring is smaller than the threading diameter of the nut 28. Loss of contact between the ring 39 and the annular surface 29 of the nut is detected by the contact detection device. A loss of contact indicates the initial position of the nut 28 on the screw 20.

The distance $L_p$ covered by the nut 28 from this initial position is then calculated in real time by the calculator 46 and stored in the memory 48. For example, the distance $L_p$ is equal to the thread pitch multiplied by the number of turns made by the nut from its initial position. The number of turns is measured, for example, by means of a motor shaft 36 rotation angle sensor.

In a second step 102, subsequent to the first step, the ultrasonic transducer 38 is activated to emit ultrasonic waves into the end 27 of the screw, and receive ultrasonic waves reflected by the end surface of the head of the screw 20.

The processor 44 is configured to measure a first parameter, representative of the axial tension in the screw.

In a first embodiment, the ultrasonic transducer 38 is configured to emit longitudinal or transverse ultrasonic waves. The first parameter is the acoustic time-of-flight of a longitudinal or transverse ultrasonic wave measured at defined time intervals. The calculator 46 is thus configured to calculate the variation in time-of-flight, said variation providing an indirect measure of the tension in the screw.

In a second embodiment, the ultrasonic transducer 38 is configured to emit longitudinal ultrasonic waves. The first parameter is the time shift of the resonance frequency induced in the screw by the ultrasonic waves. The processor 44 is thus configured to measure a screw resonance frequency, and the calculator 46 is configured to calculate the offset of the screw resonance frequency, said offset providing an indirect measure of the tension in the screw.

In a third embodiment, the ultrasonic transducer 38 is configured to emit longitudinal and/or transverse ultrasonic waves. The first parameter is the ratio of the ultrasonic wave's time-of-flight to the thickness to be tightened, said ratio providing an indirect measure of the tension in the screw. The processor 44 is thus configured to measure the time-of-flight of a longitudinal or transverse wave, and the calculator 46 is configured to calculate said ratio.

In a third step 103, simultaneous with the second step 102, the signals from the motor torque or current intensity sensor 40 are sent to the processor 44, which processes the signals and sends them to the calculator 46. The calculator 46 is further configured to calculate a second parameter representative of a variation in torque or the current intensity of the electric motor relative to time.

In a fourth step 104, following the first three steps, the calculator detects the start of tightening, which corresponds to the generation of tension in the screw. This start of tightening corresponds to the moment when the nut 28 contacts the rear surface 16 of the structure 12. Various methods and means can be used to detect the start of tightening.

In a first method, the calculator 46 can be configured to detect a variation in torque over time $\Delta C/\Delta t$, or a variation in motor current intensity over time $\Delta I/\Delta t$, above a predefined threshold. The calculator identifies a point in time $t_s$ at the start of the tightening as the moment when the torque or current intensity variation reaches the predefined threshold.

In a second method, the calculator 46 can be configured to detect a change in the slope of the curve of the measured torque over time $\Delta C/\Delta t$, or of the measured current intensity over time $\Delta I/\Delta t$, for example by identifying the inflection point of one of said curves. The calculator is able to linearize the slope beyond the inflection point, the intersection of the linear line and the time abscissa indicating the point in time $t_s$ at which the tightening begins.

Whichever method is used, the calculator 46 determines the distance $L_p$ covered by the nut 28 from a point in time to which corresponds to the initial position of the nut on the screw (FIG. 2), compared to a point in time $t_s$ at the start of tightening, which corresponds to the moment when the nut 28 comes into contact with the rear face 16 of the structure 12 (FIG. 3).

In a fifth step 105, the calculator 46 determines the thickness of the structure to be tightened as a function of the distance covered by the nut defined in the previous step, and as a function of the geometrical characteristics of the fastener. These characteristics include the length $L_0$ of the screw 20, the length $L_t$ of the screw head, the length of the threaded portion 26 of the screw, the screw thread pitch, the length $L_e$ of the nut 28, the length of the threading and the distance between the end surface of the nut and a locking point if the nut is locked, the standardized part reference of the screw and nut, the materials of the screw and the nut, the standardized part references of the screw and the nut threads, etc.

These geometrical characteristics may already be contained in the memory 48 of the control unit.

In the optional case where these characteristics are integrated into the marking(s) 60 on the screw and/or nut, a suitable reader such as a camera, capable of reading said markings and sending the characteristics to the calculator 46, must be used beforehand, so that the information is provided to the calculator to perform the calculation. The corresponding optional step 108, which involves reading the marking and identifying at least one geometrical feature of the screw and the nut, is shown as a dotted line in FIG. 5.

In one embodiment, the structural thickness $L_1$ to be tightened is calculated by subtracting from the screw length $L_0$ the distance $L_p$ covered by the nut 28 from its initial position to the start of tightening position, the length $L_t$ of the screw head 22 and the length $L_e$ of the nut.

In a sixth step 106, the calculator 46 determines a target value for the first parameter to be reached in accordance with the tightened thickness $L_1$ calculated in the previous step.

In a first embodiment, the calculator 46 is configured to compare the thickness to be tightened $L_1$ with a set of thickness values $L_1$ stored in the memory 48. Each thickness in the set of values is associated with a target value of the first parameter.

Figure 6:
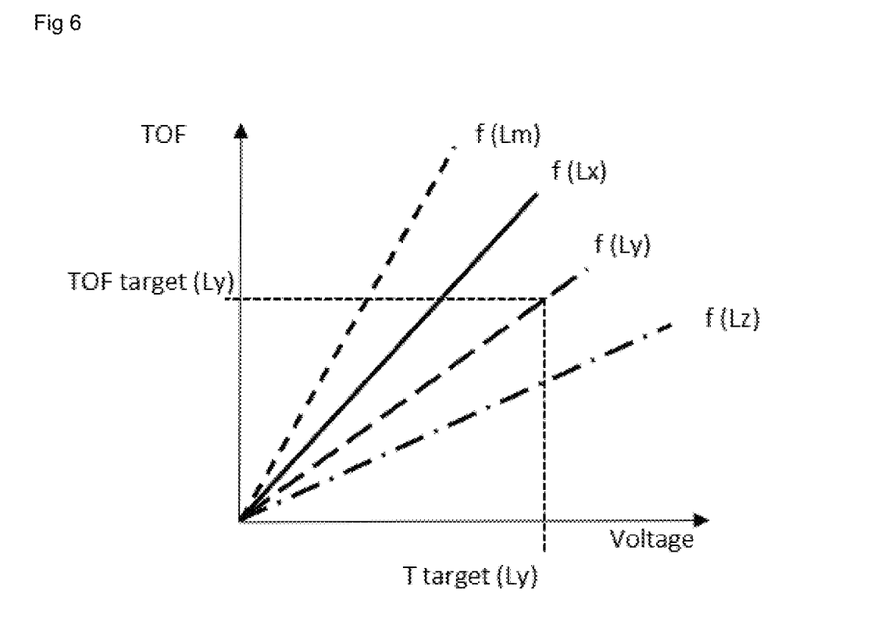
FIG. 6 is a graphical representation of data for implementing the process shown in FIG. 5.

FIG. 6 shows in the form of a graph the TOF time-of-flight and target voltage values of four identical fasteners 10 inserted in four structures of different thicknesses, denoted Lm, Lx, Ly and Lz respectively. For example, if the calculator determines that the tightened thickness is Ly, then it deduces that the target time-of-flight is "TOF target (Ly)", corresponding to a target voltage "T target (Ly)".

In a second embodiment, the calculator 46 is configured to use the thickness of the structure to be tightened by means of a mathematical equation stored in the memory 48, in which the thickness is a variable and one or more geometrical characteristics of the screw are represented by one or more constants, to calculate the target value of the first parameter.

The mathematical equation can incorporate other variables, such as the screw temperature from the temperature sensor 42, to adjust the target value of the first parameter.

The discrete values of the first parameter or the constants of the mathematical equation are preferably determined by one or more test plans carried out with one or more fasteners 10 inserted in at least two structures of different thicknesses, prior to the installation of the fastener 10, whose time-of-flight and axial tension generated in the screw are measured.

In a seventh step 107, the control unit 50 stops the motor 34 when the first measured parameter is equal to the target value determined in step 106. The measured value of the first parameter can be stored in the memory 48 in conjunction with a reference for the screw 20, for subsequent measurement of the installed tension and possible subsequent tightening of the nut 28 if the tension in the screw decreases over time.

The process is not limited to the example described above. For example, in an alternative embodiment, the screw head 22 has a non-circular internal or external shape, such as a hexagon, enabling a tool (not shown) to maintain the screw in a rotational position. The screw head can, of course, be countersunk.

Any means other than the ring 39, the ultrasonic transducer 38 and the contact detection device between the ring 39 and the nut 28 can be used to identify the initial position of the nut on the screw.

What is claimed:

1. A method of installing a threaded fastener into a hole in a structure, the threaded fastener including a screw, having an end, a length ($L_0$) and a head having a length ($L_t$), and a nut having a length ($L_e$), the method comprising the following steps:
    a) inserting the screw into the hole, placing the nut at an initial position on the end of the screw, and screwing the nut onto the screw,
    b) simultaneously transmitting ultrasonic waves into the fastener and receiving reflected ultrasonic waves for the measurement of a first parameter representative of a variation in said waves, said first parameter providing an indirect measure of an axial tension in the screw,
    c) stopping the screwing when a target value for the first parameter is reached, characterized in that the process further comprises the following steps:
    d) determining the thickness of the structure to be tightened ($L_1$) by calculating the thickness ($L_1$) with a calculator during the screwing of the nut onto the screw, and
    e) determining the target value of the first parameter in accordance with the thickness of the structure to be tightened ($L_1$) and geometrical characteristics of the fastener (10).

2. The method according to claim 1, wherein the first parameter is selected from: a time-of-flight of a longitudinal ultrasonic wave; a resonance frequency shift of the screw; and a ratio of the time-of-flight of a longitudinal or transverse ultrasonic wave to the thickness ($L_1$) of the structure to be tightened.

3. The method according to claim 1, wherein the geometrical characteristics of the fastener are selected from: the length ($L_0$) of the screw, a length of the threaded portion of the screw, a screw thread pitch, the nut length ($L_e$), a nut counterbore length, a threading length of the nut and a distance between an end surface of the nut and at least one locking point.

4. The method according to claim 1, wherein determining the target value of the first parameter comprises comparing the structural thickness with a set of thickness values, said set of thickness values being associated with a set of target values of the first parameter for a given screw, corresponding to a set of target tensions for a given screw.

5. The method according to claim 1, in which determining the thickness of the structure ($L_1$) comprises a step of detecting the start of tightening of the structure, corresponding to the application of axial tension in the screw.

6. The method according to claim 5, in which a screwing step is performed with an installation device provided with an electric motor, the method further comprising: measuring a second parameter representative of an energy variation of the electric motor as a function of time; and detecting the start of tightening, said start of tightening corresponding to a predetermined variation of the second parameter.

7. A method of installing a threaded fastener into a hole in a structure, the threaded fastener comprising a screw and a nut, the method comprising the following steps:
    a) inserting the screw into the hole, and screwing the nut onto the screw with an installation device provided with an electric motor,
    b) simultaneously transmitting ultrasonic waves into the fastener and receiving reflected ultrasonic waves for the measurement of a first parameter representative of a variation in said waves, said first parameter providing an indirect measure of an axial tension in the screw,
    c) stopping the screwing when a target value for the first parameter is reached, characterized in that the process further comprises the following steps:
    d) determining the thickness of the structure to be tightened ($L_1$), including a step of detecting the start of tightening of the structure, corresponding to the application of axial tension in the screw, e) determining the target value of the first parameter in accordance with the thickness of the structure to be tightened ($L_1$) and geometrical characteristics of the fastener (10), measuring a second parameter representative of an energy variation of the electric motor as a function of time, and detecting the start of tightening, said start of tightening corresponding to a predetermined variation of the second parameter, wherein the second parameter is selected from the current intensity of an electric motor and the torque of a drive shaft.

8. The method according to claim 1, in which the determination of the structure thickness comprises a step of detecting the initial position of the nut on the screw.

9. A method of installing a threaded fastener into a hole in a structure, the threaded fastener comprising a screw and a nut, the method comprising the following steps:
   a) inserting the screw into the hole, and screwing the nut onto the screw,
   b) simultaneously transmitting ultrasonic waves into the fastener and receiving reflected ultrasonic waves for the measurement of a first parameter representative of a variation in said waves, said first parameter providing an indirect measure of an axial tension in the screw,
   c) stopping the screwing when a target value for the first parameter is reached, characterized in that the process further comprises the following steps:
   d) determining the thickness of the structure to be tightened ($L_1$), including a step of detecting the initial position of the nut on the screw by Bringing an annular metal element into contact with an annular surface of the nut, an inner diameter of the annular metal element being smaller than a inner diameter of the annular surface of the nut, Detecting contact between the annular metal element and the annular surface of the nut, Rotating the nut on the threaded portion of the screw, and applying pressure to the annular metal element so as to maintain contact with the annular surface of the nut, and Detecting a loss of contact between the annular metal element and the annular surface of the nut as soon as one end of the threaded portion passes through the inner diameter of the annular surface of the nut, the detection of the loss of contact corresponding to the initial position of the nut, and
   e) determining the target value of the first parameter in accordance with the thickness of the structure to be tightened ($L_1$) and geometrical characteristics of the fastener (10).

10. The method according to claim 1, further comprises monitoring the temperature in the screw, and adjusting the target value of the first parameter according to the temperature.

11. The method according to claim 1, wherein at least one of said screw and said nut comprises a marking containing at least one identifier or geometrical characteristic of said screw or nut, the installation method further comprising a step of reading the marking and identifying at least the identifier or the geometrical characteristic of the screw and/or nut, said reading step being performed prior to step e).

12. The method according to claim 1, wherein
stopping the screwing comprises stopping the screwing when the nut has covered a distance ($L_p$) from the initial position to a start of tightening position; and
calculating the thickness ($L_1$) comprises subtracting from the screw length ($L_0$) the distance ($L_p$) from the initial position to the start of tightening position, the screw head length ($L_t$) and the nut length ($L_e$).

\* \* \* \* \*